Jan. 10, 1961 W. H. TAYLOR 2,967,405
METHOD AND APPARATUS FOR CHILLING CARCASSES
OF SLAUGHTERED ANIMALS
Filed July 26, 1955 3 Sheets-Sheet 2
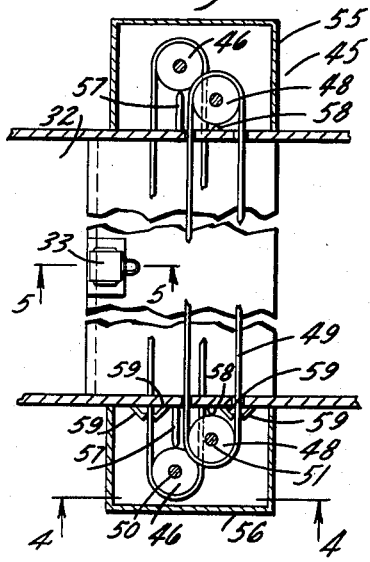
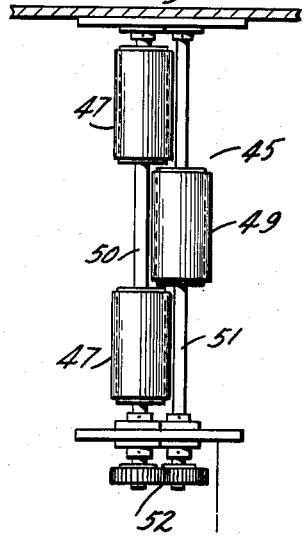
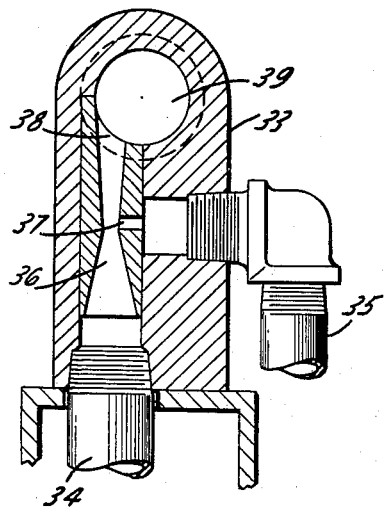
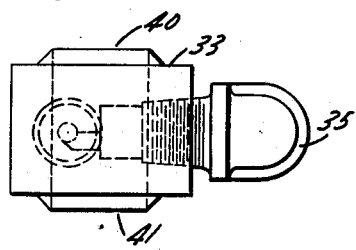
INVENTOR.
William H. Taylor
BY
Wheeler, Wheeler & Wheeler
ATTORNEYS INVENTOR.
William H. Taylor
BY
Wheeler, Wheeler & Wheeler
ATTORNEYS

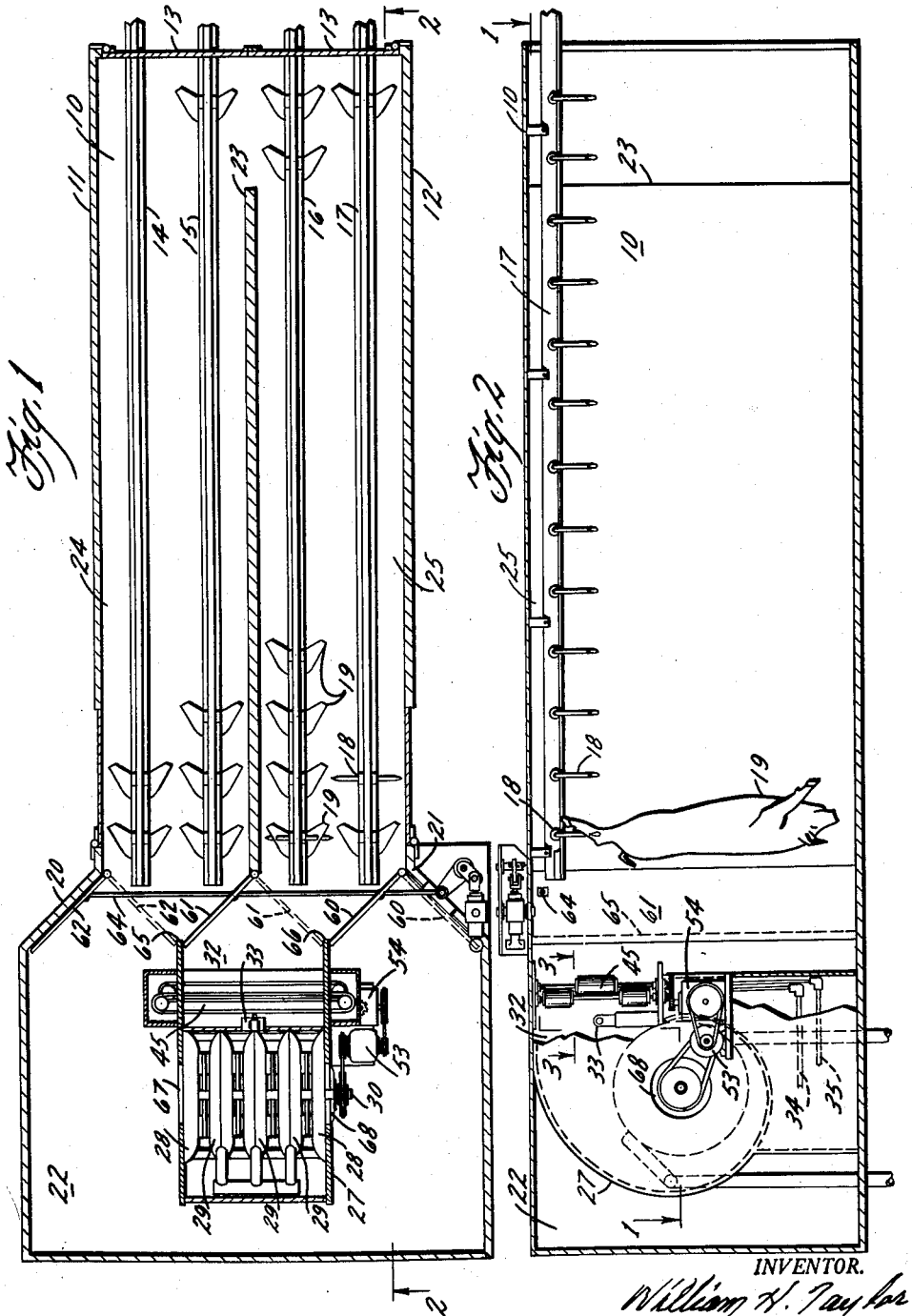

United States Patent Office 2,967,405
Patented Jan. 10, 1961

2,967,405

METHOD AND APPARATUS FOR CHILLING CARCASSES OF SLAUGHTERED ANIMALS

William H. Taylor, Chicago, Ill.
(1710 Park Drive, Raleigh, N.C.)

Filed July 26, 1955, Ser. No. 524,322

9 Claims. (Cl. 62—284)

This invention relates to method and apparatus for chilling carcasses of slaughtered animals.

In the preferred embodiment disclosed, the method is a batch method. In the broader aspects of the invention, it is immaterial whether the carcasses are treated in batches. The batch embodiment is preferred only because it makes use of existing slaughter house facilities.

Carriers upon which the carcasses are suspended are moved on overhead tracks into a tunnel having circulatory connections with a room in which air is chilled by passing it over refrigerator heat exchange surfaces. Doors or baffles are adjusted from time to time to cause reversal of the direction of flow of the chilled air through the tunnel so that all of the carcasses, and all sides of each carcass, are reduced in temperature with substantial uniformity.

Because the air becomse dehydrated in traversing the refrigerated heat exchange surfaces, moisture is restored to the air in the form of vapor or atomized mist. This is extremely important in that it precludes the dehydration of the carcasses with consequent loss of value. It is desirable to remove all droplets of water from the air entering the tunnel lest these build up as ice upon the mechanism and the carcasses. To this end, I provide a series of trapping baffles past which the air and water vapor must move to reach the tunnel and these trapping baffles desirably comprise belts which are operated slowly to cross the path of the air and water and provided externally of the air passage with scraping means for removing any accrued ice.

In the drawing:

Fig. 1 is a view taken in section on the line 1—1 of Fig. 2.

Fig. 2 is a view taken in section on the line 2—2 of Fig. 1.

Fig. 3 is a detail view on an enlarged scale taken in section on the line 3—3 of Fig. 2.

Fig. 4 is a view taken in section on the line 4—4 of Fig. 3.

Fig. 5 is a further enlarged detail view taken in section on the line 5—5 of Fig. 3.

Fig. 6 is a plane view of the spray nozzle shown in Fig. 5.

Figure 7:
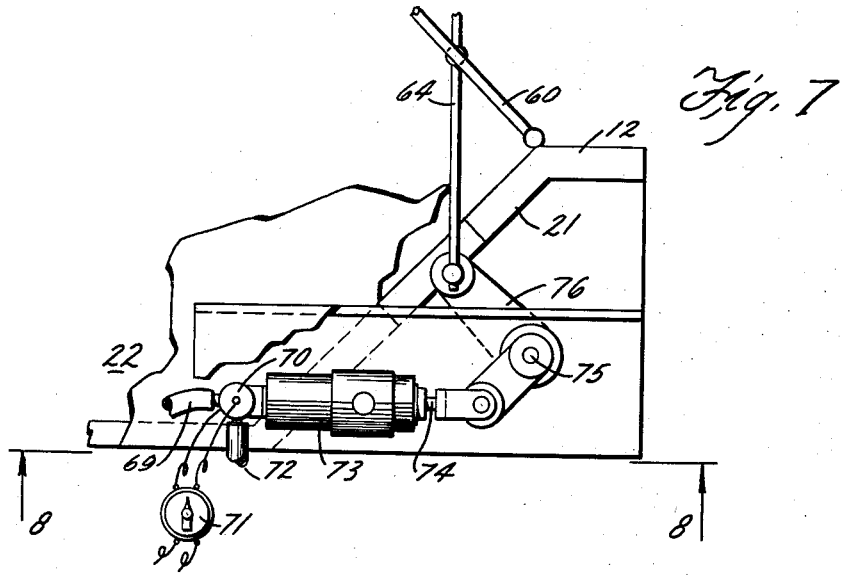
Fig. 7 is a fragmentary detail view showing on an enlarged scale a portion of the door or baffle operating mechanism shown in Fig. 1.

The tunnel in which carcasses are disposed for treatment is indicated generically by reference character 10. It is made by side wall enclosures 11 and 12 and gates 13 which surround sections 14, 15, 16 and 17 of four overhead conveyor tracks from which carriers 18 support the carcasses 19 which are to be refrigerated. The refrigerating rooms of packing houses are already provided with conveyor tracks and carriers such as those illustrated.

The side walls 11 and 12 of the enclosure made in accordance with the present invention are connected at the ends remote from their gates 13 with the oblique portions 20 and 21 of the walls of an air refrigerating room 22. The air refrigerating room is slightly wider than the overall width of the tunnel 10 in order to provide space for the operation of the doors or baffles hereinafter described.

Tunnel 10 is divided into two sections by a partition 23 which extends from the vicinity of the air chilling room 22 in the direction of gates 13 but terminates short of such gates to permit easy communication of the air stream between the tunnel sections 24 and 25 which are separated by the partition.

Within the air chilling room 22 is disposed a heat exchange apparatus which comprises a housing 27 having a volute wall and annular heat exchange members 28 and 29 and a rotor 30 comprises a shaft and air impelling blades thereon as disclosed in my Patent No. 2,321,262. Air is admitted axially to the spaces between the annular refrigerant chambers 28, 29 and is expelled centrifugally through the discharge port 32.

The air, dehydrated in traversing the heat exchange surfaces 28, 29, is re-humidified by vapor introduced into it by any suitable nozzle. A preferred nozzle structure is shown at 33 and separately illustrated in Figs. 5 and 6. Air under pressure is supplied to the nozzle through a pipe 34 and water enters through a pipe 35. The air traverses a venturi passage 36 into which the water is admitted through duct 37 near the point of greatest restriction. The venturi passage discharges at 38 tangentially into a transverse bore 39 which opens laterally at both ends to discharge spray at 40 and 41 into the path of the dehydrated air. The whirling motion of the air and spray issuing at 40 and 41 from the atomizing nozzle is calculated to achieve wide distribution of the moisture in the air stream discharged from port 32 from the refrigerating heat exchanger. Most of the atomized moisture will immediately be evaporated by the dehydrated air. Insofar as any droplets remain unevaporated, these are trapped in the baffle generically designated by reference character 45. In the preferred embodiment, this baffle comprises a series of staggered surfaces upon which any discrete droplets will deposit. In order that these may not build up excessive increments of ice, it is preferred that the baffle surfaces be continuously cleared by scraping.

To this end, I arrange in the preferred embodiment of the invention upper and lower sets of pulleys 46 for upper and lower belts 47 and intermediate pulleys 48 for an intermediate belt 49. It will be apparent upon examination of Figs. 3 and 4 that a run of each of the three belts is interposed between, but axially offset from, two runs of each adjacent belt. In consequence, a current of air traversing the baffle portion 45 will impinge first against the first encountered runs of upper and lower belts 47 and the intermediate belt 49. It will then have to pass between the runs of the upper and lower belts 47 in order to clear the first encountered run of belt 49. It will then encounter the inner faces of the runs of belts 47 and can clear these only by passing between the runs of belt 49. In traversing this tortuous path through the baffling arrangement, the air will deposit on the belt surfaces any discrete particles of water which it carries and these will freeze on the belts.

The shafts 50 and 51 which support the pulleys 46 and 48, respectively, are intergeared at 52 and positively driven at low speed from motor 53 through reduction gearing 54 (Fig. 1 and Fig. 2). The pulleys and shafts are enclosed in boxes 55, 56 disposed outside of the air flow port 32. Within these boxes, there are scrapers 57, 58 applied to the respective pulleys and scrapers 59 operating upon the respective belts so that any ice forming on the belts or the pulleys is dislodged and collected at the bottom of the boxes 55, 56.

In order to guide the re-humidified flow of refrigerated air from the passage 32 alternately into one end or the other of the tunnel at which the carcasses hang for refrigeration, three doors or baffles are provided at 60, 61 and 62. These are hinged respectively to side wall 12 of the tunnel and side wall 11 of the partition 23 of the tunnel and side wall 11 of the tunnel. They are connected by a link 64 for concurrent operation. Their free ends are movable to and from engagement with the ends 65 and 66 of the side walls of the housing 22 for the air refrigerating mechanism. With the doors 60, 61 and 62 in the position shown in full lines in Fig. 1, the entire output of refrigerated and re-humidified air enters tunnel passage 25, passes around partition 23 and returns through tunnel passage 24 to the air conditioning room 22. Here it re-enters the refrigerating chamber 27 through the axial inlet ports at 67 and 68 and is again chilled, humidified and recirculated.

Either manually or at intervals determined by a timer, the position of the door is reversed to that shown in dotted lines, whereupon the refrigerated and re-humidified air is blown from the refrigerating apparatus into tunnel passage 24, around partition 23, and back through tunnel passage 25 to the air conditioning room 22.

Figure 8:
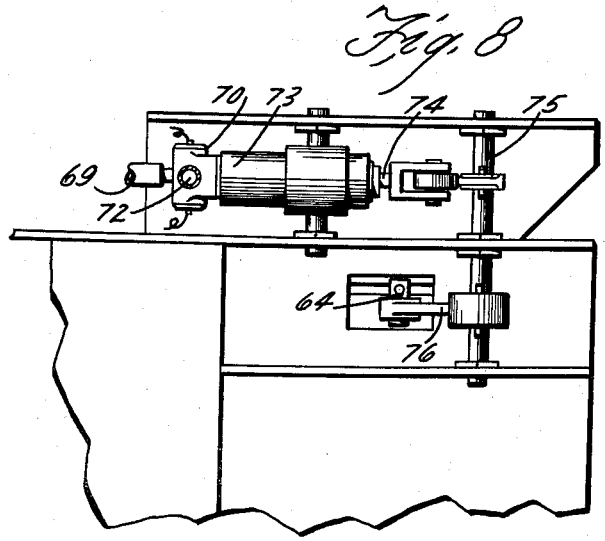
Fig. 8 is a view taken in section on the line 8—8 of Fig. 7.

In Fig. 7 and Fig. 8, there has been illustrated diagrammitically a means for operating the doors 60. Air under pressure is supplied through the hose 69 subject to the control of a solenoid valve 70 periodically energized by timer 71. The valve has a vent at 72. As the valve is operated to connect the cylinder 73 alternately with air under pressure or with the vent 72, the piston 74 is actuated forth and back to communicate motion by means of rock shaft 75 and arm 76 to the link 64.

The method here involved is most easily practiced through the use of the apparatus herein disclosed, but is susceptible of being practiced manually or through the use of other mechanisms. As compared with conventional chilling methods in which carcasses are subjected to cold storage in a room in which the air is relatively quiescent, the rapidly moving currents of air here involved reduce the carcasses to the desired temperature in a fraction of the time previously needed. However, it is not practicable to use rapidly circulating refrigerated air to chill the carcasses unless there is frequent relative movement between the carcasses and the current of air so that the various carcasses are exposed substantially uniformly and the various surfaces of each carcass are exposed substantially uniformly. In addition, when the rapidly moving current of air is used to refrigerate the carcasses, it is extremely important that the air be re-humidified after being cooled. Drying of the carcass not only reduces its quality but, in reducing its weight, effects further reduction in carcass value.

Because of the extremely low temperatures involved, re-humidification is not practicable without baffling the re-humidified air. Otherwise, heavy deposits of ice form upon the tunnel and the controlling doors and upon the carcasses themselves. The ice formations on the carcasses act as insulation to decrease radically the rate at which the carcasses may be cooled by exposure to the rapidly re-circulated refrigerated air.

The following figures are given merely by way of exemplification and not by way of limitation. The tunnel as shown will hold, on its four tracks, about 80 hogs weighing approximately 8 tons. These are received into the tunnel at about 100° F. and cooled within ten hours to about 40° F. The rate of air motion may be on the order of 1500 feet per minute.

I claim:

1. The combination with a tunnel, of air impelling means and a refrigerated heat exchanger in the path of air movement, the tunnel having means for supporting carcasses to be refrigerated in the path of the refrigerated air, an air conditioning chamber with which both ends of the tunnel communicate and in which the air impelling means and heat exchanger are disposed, means for effecting relative movement between the carcasses and the air flow comprising doors controlling communication between said impelling means and the respective ends of the tunnel, and means for the periodic operation of such doors to effect reversal of air flow through the tunnel.

2. The combination with a chamber for carcasses, a refrigerating heat exchanger means for blowing a refrigerating gas over said heat exchanger to be chilled and for delivering such gas to the carcasses to be cooled, a humidifier in the path of the gas delivered from the heat exchanger toward the carcasses, and a baffle comprising movable elements in the path of the humidified gas, and means for discharging from such elements ice accumulating thereon.

3. The device of claim 2 in which the baffle comprises a series of belts having staggered runs.

4. The device of claim 3 in which the means for discharging ice comprises scrapers interacting with the respective belts.

5. The combination with tunnel means having carcass conveyors and proximately located ends, of an air conditioning chamber with which the tunnel ends communicate, a refrigerating heat exchanger, and air circulating means in the chamber and provided with spaced housing walls, the tunnel ends having walls offset from said first mentioned walls, and doors hingedly mounted on certain of said walls and movable selectively to and from engagement with others of said walls for reversing the flow of refrigerated air to said tunnel means.

6. In a device of the character described, the combination with an air conditioning chamber, of an air circulator therein comprising a housing having an inlet from said chamber and an outlet provided with laterally spaced walls, and air circulating means within the housing, a refrigerating heat exchanger within the housing, a tunnel comprising spaced side walls and a partial partition, said side walls being connected with the air conditioning chamber and said partition terminating adjacent said chamber, and hingedly mounted baffle doors for connecting spaced housing side walls selectively with the side walls and partition of the tunnel, whereby air flow from said housing can be directed into either end of the tunnel and about the partition, return flow being directed from the other end of the tunnel into such chamber.

7. The device of claim 6 in which the portions of the tunnel at opposite sides of the partition are provided with carcass conveyor supports.

8. The device of claim 6 in further combination with means in said housing for re-humidifying circulated air chilled by passage over said heat exchanger and prior to re-admission of said air into the tunnel.

9. The device of claim 8 in further combination with a baffle comprising endless belts having staggered runs in the path of re-humidified air.

References Cited in the file of this patent

UNITED STATES PATENTS

| | | |
|---|---|---|
| 1,068,272 | Rayson | July 22, 1913 |
| 1,322,804 | Macfadden | Nov. 25, 1919 |
| 1,609,841 | Smith | Dec. 7, 1926 |
| 1,982,137 | Hanley | Nov. 27, 1934 |
| 2,012,559 | Friedrich | Aug. 27, 1935 |
| 2,065,358 | Zorotschenzeff | Dec. 22, 1936 |
| 2,259,007 | Story | Oct. 14, 1941 |
| 2,265,858 | Reynoldson | Dec. 9, 1941 |
| 2,277,382 | Botz | Mar. 24, 1942 |
| 2,370,886 | Solberg | Mar. 6, 1945 |
| 2,439,487 | Reilly | Apr. 13, 1948 |
| 2,537,390 | Baker | Jan. 9, 1951 |